Patented Oct. 30, 1934

1,978,792

UNITED STATES PATENT OFFICE 1,978,792

AQUEOUS TREATMENT OF ARTIFICIAL SILK

Archibald John Hall, Timbersbrook, England, assignor to Celanese Corporation of America, a corporation of Delaware No Drawing. Original application July 22, 1925, Serial No. 45,416. Divided and this application December 24, 1929, Serial No. 416,305. In Great Britain July 31, 1924

3 Claims. (Cl. 8—20)

This invention relates to the treatment of cellulose acetate products with hot or boiling aqueous liquors and is a division of my Patent No. 1,765,581, dated June 24, 1930.

It is well known that when cellulose acetate artificial silk is immersed in boiling water or water whose temperature exceeds about 85° C., it becomes curly and wool-like and loses a considerable proportion of its lustre and transparency. I have now discovered, and this discovery forms the basis of this invention, that the resistance against delustring of such silk when heated at about 100° C., for prolonged periods in the presence of water, is increased by the presence of soluble salts of sodium.

Generally the protective power of sodium salts is greater in concentrated aqueous solution than in dilute solution. For example cellulose acetate silk becomes woolly and opaque and loses most of its lustre when heated for three minutes in boiling water, but retains its original appearance and properties when heated for one hour at 100° C., in an aqueous solution containing 12% of sodium chloride or 25% of crystalline sodium sulphate. On the other hand cellulose acetate silk similarly heated for one hour at about 100° C., in an aqueous solution containing 5% of sodium chloride becomes somewhat woolly and suffers a partial loss of lustre and transparency.

The following are examples of suitable sodium salts for use as protective substances towards cellulose acetate artificial silk:

Salt.

Sodium bichromate
Sodium sulphite
Sodium phosphate (di-basic)
Sodium nitrite
Sodium bisulphite
Sodium acetate
Sodium thiosulphate
Sodium ferrocyanide
Sodium chlorate
Sodium nitrate
Sodium bromide
Sodium chloride
Sodium sulphate
Sodium hydrosulphite
Sodium tartrate All the above substances exert their protective action for cellulose acetate when used in from 10% to 30% aqueous solution, but it is understood that these limits of concentration are only stated approximately, and the following table gives the approximate value of concentration for several of the substances.

| Salt | Approximate concentration of aqueous solution in which protection of cellulose acetate is evident. |
|---|---|
| Sodium chloride | 10 grams in 100 cc. of water. |
| Sodium sulphate | 25 grams in 100 cc. of water. |
| Sodium phosphate | 20 grams in 100 cc. of water. |
| Sodium sulphite | 20 grams in 100 cc. of water. |
| Sodium hydrosulphite | 20 grams in 100 cc. of water. |

Among numerous processes in which my discovery has useful applications are; the dyeing in boiling liquors of fabrics containing cellulose acetate and woollen fibres, the discharging of dyed cellulose acetate fabrics in boiling liquors, and the relief or production of latent strains in cellulose acetate fabrics or products by immersion in a boiling aqueous liquor.

What I claim and desire to secure by Letters Patent is:—

1. In the treatment of textile materials, films and like materials comprising cellulose acetate by processes which are without substantial effect on the chemical character of the materials, which processes comprise treatments with aqueous media at temperatures in excess of about 85° C., the step of preventing loss of lustre of the materials which comprises carrying out such treatments in the presence of a sodium salt of a water soluble acid, which salt is chemically inert with respect to the cellulose acetate, in aqueous solution in at least 10% concentration.

2. In the treatment of textile materials, films and like materials comprising cellulose acetate by processes which are without substantial effect on the chemical character of the materials, which processes comprise treatments with aqueous media at boiling temperature, the step of preventing loss of lustre of the materials which comprises carrying out such treatments in the presence of a sodium salt of a water soluble acid, which salt is chemically inert with respect to the cellulose acetate, in aqueous solution in at least 10% concentration.

3. In the treatment of textile materials, films and like materials comprising cellulose acetate by processes which are without substantial effect on the chemical character of the materials, which processes comprise treatments with aqueous media at temperatures in excess of about 85° C., the step of preventing loss of lustre of the materials which comprises carrying out such treatments in the presence of a sodium salt of a water soluble acid, which salt is chemically inert with respect to the cellulose acetate, in aqueous solution of 10-30% concentration.

ARCHIBALD JOHN HALL.